United States Patent
Reinards et al.

(10) Patent No.: US 7,244,215 B2
(45) Date of Patent: Jul. 17, 2007

(54) TRANSMISSION CONTROL SYSTEM AND METHOD

(75) Inventors: Marco Reinards, Bleialf (DE); Nicolai Tarasinski, Frankenthal (DE)

(73) Assignee: Deere & Company, Moline, IL (US)

(*) Notice: Subject to any disclaimer, the term of this patent is extended or adjusted under 35 U.S.C. 154(b) by 163 days.

(21) Appl. No.: 10/848,957

(22) Filed: May 19, 2004

(65) Prior Publication Data
US 2004/0237682 A1 Dec. 2, 2004

(30) Foreign Application Priority Data
May 27, 2003 (DE) .............................. 103 24 095

(51) Int. Cl.
*B60W 10/02* (2006.01)
(52) U.S. Cl. ........................................ 477/70; 477/908
(58) Field of Classification Search ................ 477/908, 477/70, 115, 154, 155, 143; 74/335, 336 R, 74/340, 404, 745; 701/56, 55; 192/3.58, 192/83, 3.56
See application file for complete search history.

(56) References Cited
U.S. PATENT DOCUMENTS

| | | | | |
|---|---|---|---|---|
| 3,762,518 A | * | 10/1973 | Hilpert ..................... | 192/87.13 |
| 4,526,255 A | * | 7/1985 | Hennessey et al. ......... | 192/3.58 |
| 4,711,329 A | * | 12/1987 | Hasegawa et al. ......... | 192/3.57 |
| 4,790,418 A | * | 12/1988 | Brown et al. ................ | 701/51 |
| 4,858,495 A | * | 8/1989 | Horsch ........................ | 74/745 |
| 4,877,116 A | * | 10/1989 | Horsch ........................ | 192/3.57 |
| 4,979,599 A | * | 12/1990 | Nishida ....................... | 192/3.58 |
| 5,053,960 A | * | 10/1991 | Brekkestran et al. ......... | 701/51 |
| 5,217,097 A | * | 6/1993 | Lasoen ........................ | 192/3.58 |
| 5,265,018 A | * | 11/1993 | Sokol et al. ................ | 701/52 |
| 5,450,768 A | * | 9/1995 | Bulgrien et al. ............ | 74/336 R |
| 5,918,509 A | * | 7/1999 | Heilig et al. ................ | 74/730.1 |
| 6,159,129 A | * | 12/2000 | Holbrook et al. ........... | 477/155 |
| 7,066,862 B2 | * | 6/2006 | Bothe et al. ................. | 477/143 |

FOREIGN PATENT DOCUMENTS

| | | |
|---|---|---|
| DE | 44 00 701 A1 | 7/1994 |
| DE | 196 00 835 A1 | 7/1996 |

* cited by examiner

*Primary Examiner*—Charles A Marmor
*Assistant Examiner*—Justin K. Holmes

(57) ABSTRACT

A vehicle transmission transmits torque from an engine to a drive axle and includes a power shift transmission and a reverser module. A control system and method automatically partially disengages the reverser module during a shift of the power shift transmission with nearly no effect upon the operating condition of the engine, so that a portion of the torque generated by the engine continues to be transmitted at all times to the drive axle.

6 Claims, 4 Drawing Sheets

TRANSMISSION CONTROL SYSTEM AND METHOD

BACKGROUND

The present invention relates to a control system for a transmission which transmits torque from an engine to a drive axle of a vehicle, and which includes a power shift transmission and a reverser module.

Such transmissions are known to be used in agricultural utility vehicles, such as tractors. Shifting the power shift transmission causes a jerk which can be felt, since the multi-disk clutches of the power shift transmission are engaged or disengaged hydraulically without any modulation. This causes variations in the torque in the driveline of the vehicle and causes jerk-like vehicle movements which are unpleasant and which reduce the operating comfort.

Such jerking movements could be suppressed, for example, by controlling the engine to synchronize the output rotational speed of the engine with the new gear ratio of the power shift transmission. However, such a control of the engine could be costly to develop, since the generally complex control arrangement of the engine would then have to be further complicated by further functionality. Such a control may also result in higher fuel consumption of an internal combustion engine.

Published German patent DE 196 00 835 A1 shows a vehicle transmission which includes a power shift transmission, at least one multi-disk clutch and a further power shift transmission for shifting wider speed ranges. In order to suppress jerking motions during shift of the power shift transmission, a button is actuated manually by the operator, whereby the multi-disk clutch is disengaged for a predetermined time interval. In so far as this goes, this reduces or avoids the jerk resulting from shifting of the power shift transmission.

However, in the system of DE 196 00 835 A1, because the multi-disk clutch is completely disengaged, the connection between the engine and the drive axle is interrupted for the predetermined time interval, and this causes the vehicle stop or at least reduce its speed during operation under load or in uphill operation. This also results in a jerk which reduces operator comfort. Moreover, disengagement of the multi-disk clutch is possible only in the two upper gear ratios of the power shift gear box, since the vehicle has sufficient kinetic energy in these speed ranges so that the vehicle, as a rule, should not come to a complete stop.

It is desired to provide a control for transmission of this type which overcomes the aforementioned problems.

SUMMARY

Accordingly, an object of this invention is to provide a transmission control which reduces jerk during shifting of the power shift transmission and which avoids stopping of the vehicle.

These and other objects are achieved by the present invention, wherein a control for a transmission automatically partially disengages reverser module during shifting of the power shift transmission with only a small effect on the operating condition of the engine, so that a portion of the torque continues to be transmitted from the engine to the drive axle.

It is recognized that, in the case of a hydraulically or electromagnetically actuated clutch, the torque transmitted by the clutch is a function of the closing pressure applied to the clutch. Thus, the impact during shifting of the power shift transmission is largely compensated by a brief period of slip of the reverser module, so that the jerk during shifting practically disappears and the operating comfort is improved. No modification of the engine control system is required so that the problems connected with that are circumvented. The power shift transmission can also be shifted under load in all gear ratios without interrupting the transmission of torque from the engine to the drive axle. By automatically disengaging the reverser module, operating errors are largely avoided. Whereas, for example, with the transmission known from DE 196 00 835 A1, an operating error can occur if the operator actuates the button provided and completely disengages the clutch for the predetermined time interval, but the operator does not perform the shift, whatever the reason.

The transmission preferably includes a gearbox which can be shifted when the reverser module is disengaged. In the case of a tractor, this shifted gearbox could be configured as a so-called group shifted gearbox, with which shifting over wider speed ranges can be performed. The shifted gearbox is preferably a synchronized shifted gearbox and arranged between the engine and the drive axle.

Preferably, the engine is coupled to the power shift transmission, which in turn is coupled to a reverser module which includes a forward clutch and a reverse clutch, which in turn is coupled to the shifted gearbox. A modular configuration can thereby be attained that is advantageous in regard to a many sided product line.

The reverser module may be actuated manually, electro-hydraulically or magneto-hydraulically. The reverser module is usually manually actuated by means of a clutch pedal. In addition, an electro-hydraulic or magneto-hydraulic actuation of the reverser module of a vehicle is provided in the case of a tractor, in order to purposefully control the disengagement of the reverser module during shifting of the power shift transmission.

Alternatively, the reverser module could also be controlled by an operating direction control lever. In agricultural or industrial utility vehicles the performance of an immediate reversal of the direction of operation is necessary and is initiated by the actuation of an operating direction control lever. The reverser module could be controlled at small cost with a proportional pressure control valve which only partially disengages the reverser module.

Preferably, the reverser module can be controlled according to a predetermined characteristic curve during shifting of the power shift transmission. Such a characteristic curve could be stored in memory in the form of a look-up table in a control unit associated for the reverser module, which, for example, contains the values of pressure of a hydraulically actuated clutch as a function of time starting from initiation of the shift. Between the individual values a linear variation of the hydraulic pressure could be controlled. Since the variation with time of the actuation of the reverser module differs between an upshift and a downshift, two look-up tables are preferably provided.

Preferably, the characteristic curve varies as a function of the current operating condition of the vehicle and/or the engine so that the control system can respond to varying operating conditions while maintaining operating comfort. In particular, the minimum torque that can be transmitted by the reverser module during shifting is different during an uphill operation from that during a downhill operation. In that way the calculation of the characteristic curve on the basis of the input rotational speed of the reverser module and the load could be performed by an interpolation on a performance map. This performance map could also include one or more look-up tables, while actual values or those that are measured and that are not stored in a look-up table could be calculated by means of interpolation. The values stored in the performance map could be actualized dynamically, where the actualization could be performed, for example, on the basis of measurements of the vehicle speed, the rotational speed of the engine, etc.

DETAILED DESCRIPTION

Figure 1:
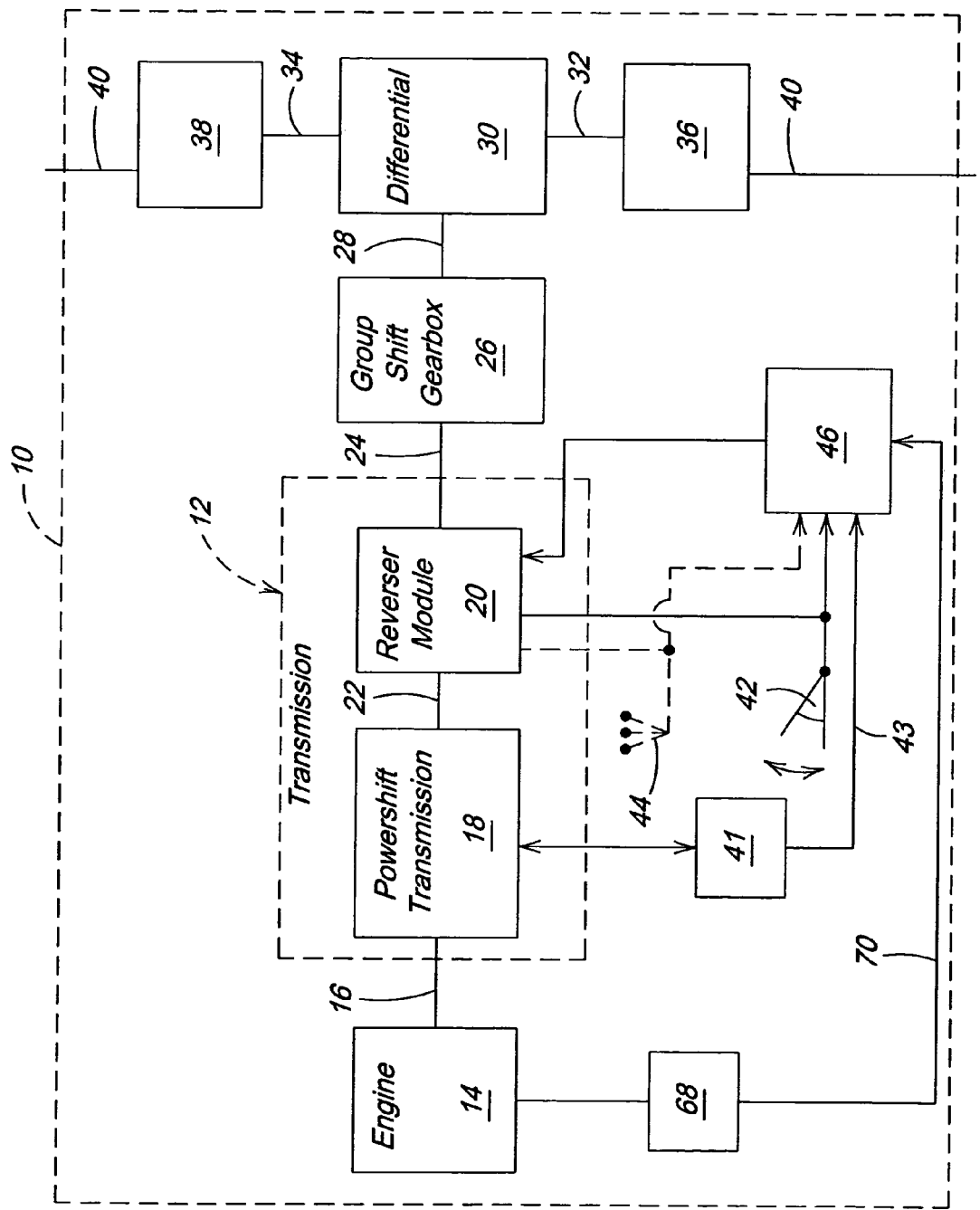
FIG. 1 is a schematic block diagram of an embodiment of the present invention.

Referring to FIG. 1, a vehicle 10, such as a tractor, includes a transmission 12 driven by an internal combustion engine 14. The torque generated by the engine 14 is transmitted to the transmission 12 by shaft 16. The transmission 12 includes a power shift transmission 18 and a reverser module 20 which are connected to each other by shaft 22. The transmission 12 is connected by shaft 24 to a gearbox 26, such as a so-called group shift gearbox, with which wider speed ranges can be shifted. The gearbox 26 is shifted during the actuation of the reverser module 20 by manual actuation by an operator. The torque from gearbox 26 is transmitted by shaft 28 to the differential gearbox 30 which transmits the torque via shafts 32, 34 to the axle gearboxes 36, 38. The axle gearboxes 36, 38 transmit torque to the drive axle 40 of the vehicle 10.

FIG. 1 indicates schematically that the reverser module 20 can be actuated by a clutch pedal 42 operatively coupled thereto, or alternatively by a direction control lever 44 operatively coupled thereto. Signals representing the operational status of pedal or lever 44 are communicated to an electronic control unit 46. The reverser module 20 is controlled in response to a control signal from control unit 46. The control unit 46 automatically partially disengages reverser module 20 during shifting of the power shift transmission 18 while the operating condition of the engine 14 remains nearly unchanged, and so that a portion of the torque from the engine 14 continues to be transmitted to the drive axle 40.

A transmission control unit 41 controls the transmission 18 and supplies to control unit 46 via line 43 a signal representing the immediate actual operating condition of the power shift transmission 18. An engine control unit 68 supplies to control unit 46 via line 70 a signal representing the actual immediate condition of the engine 14. For example, the immediate actual engine load is also used in the calculation of the characteristic curve of FIG. 4, so that when a high load is applied to the vehicle, no uncomfortable delay in shifting occurs. The control unit 46 calculates or stores the characteristic curve of FIG. 4.

Figure 2:
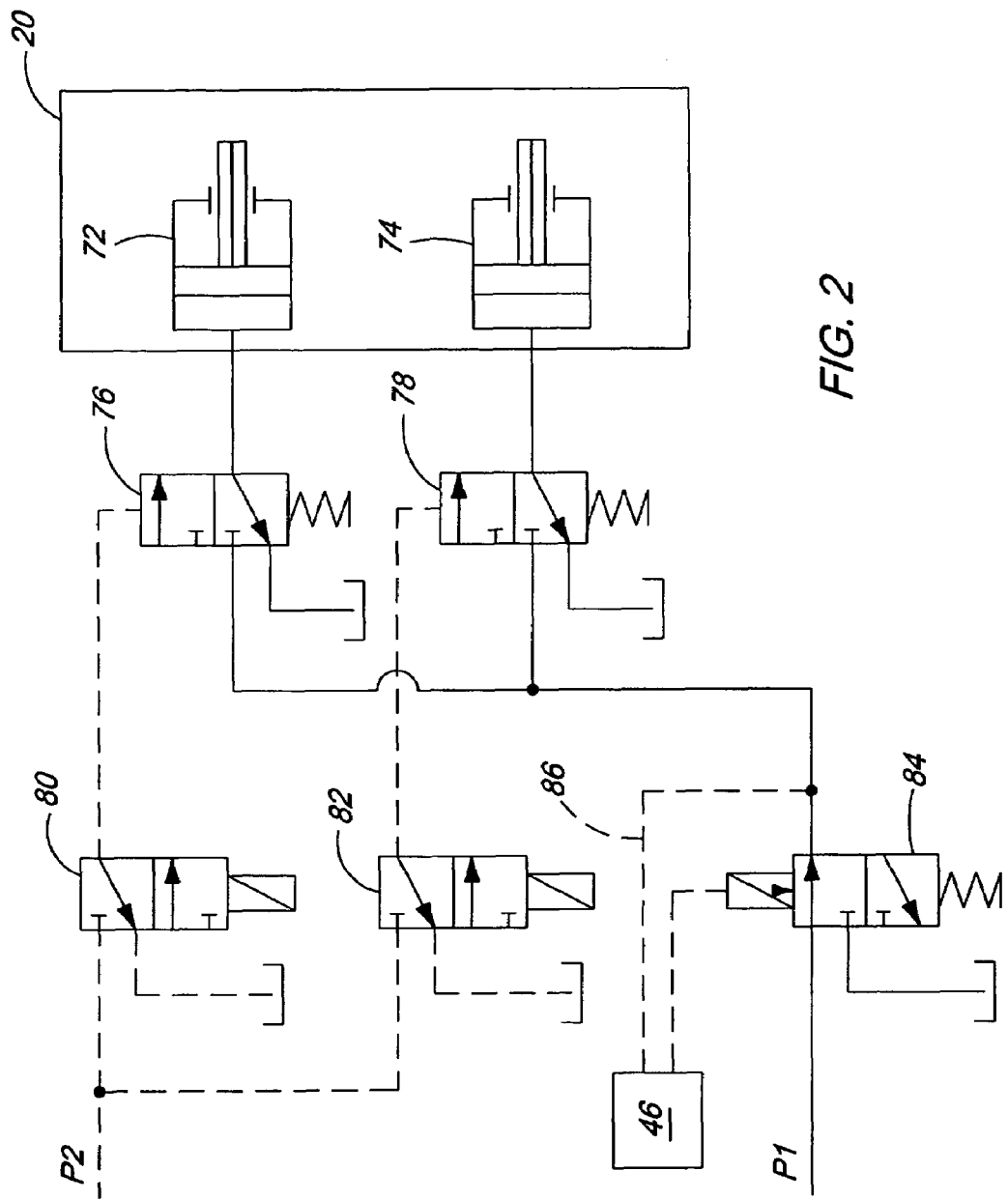
FIG. 2 is a schematic diagram of a hydraulic circuit for controlling the reverser module.

Referring now to FIG. 2, the reverser module 20 includes a forward clutch 72 and a reverse clutch 74 which are controlled by a hydraulic control circuit. The clutches 72 and 74 are each controlled by a respective 3-position/4-way on-off valve 76 and 78. Each valve 76, 78 is controlled by the control pressure p2 from a corresponding 3-position/2-way operating direction control valve 80 or 82. When one of the two on-off valves 76, 78 is activated, the associated directional clutch is actuated.

Figure 4:
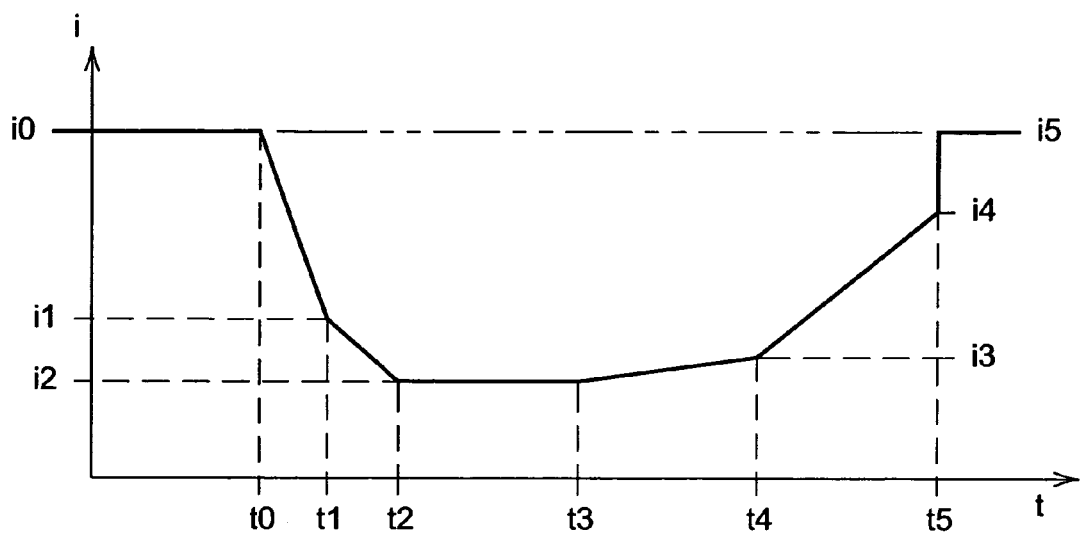
FIG. 4 is a diagram representing magnetic coil current as a function of time.

The pressure supplied to the pistons is controlled by the proportional pressure control valve 84. The pressure p1 is supplied to the solenoid actuated proportional pressure control valve 84. The solenoid current represented by FIG. 4 is supplied to solenoid of valve 84 by control unit 46 and valve 84 is opened or closed in response thereto. Thus, the pressure communicated by valve 84 to valves 76 and 78 is controlled by control unit 46 and is sensed by pressure sensing line 86, and this pressure varies in a manner similar to the variation of the electric current shown in FIG. 4.

Figure 3:
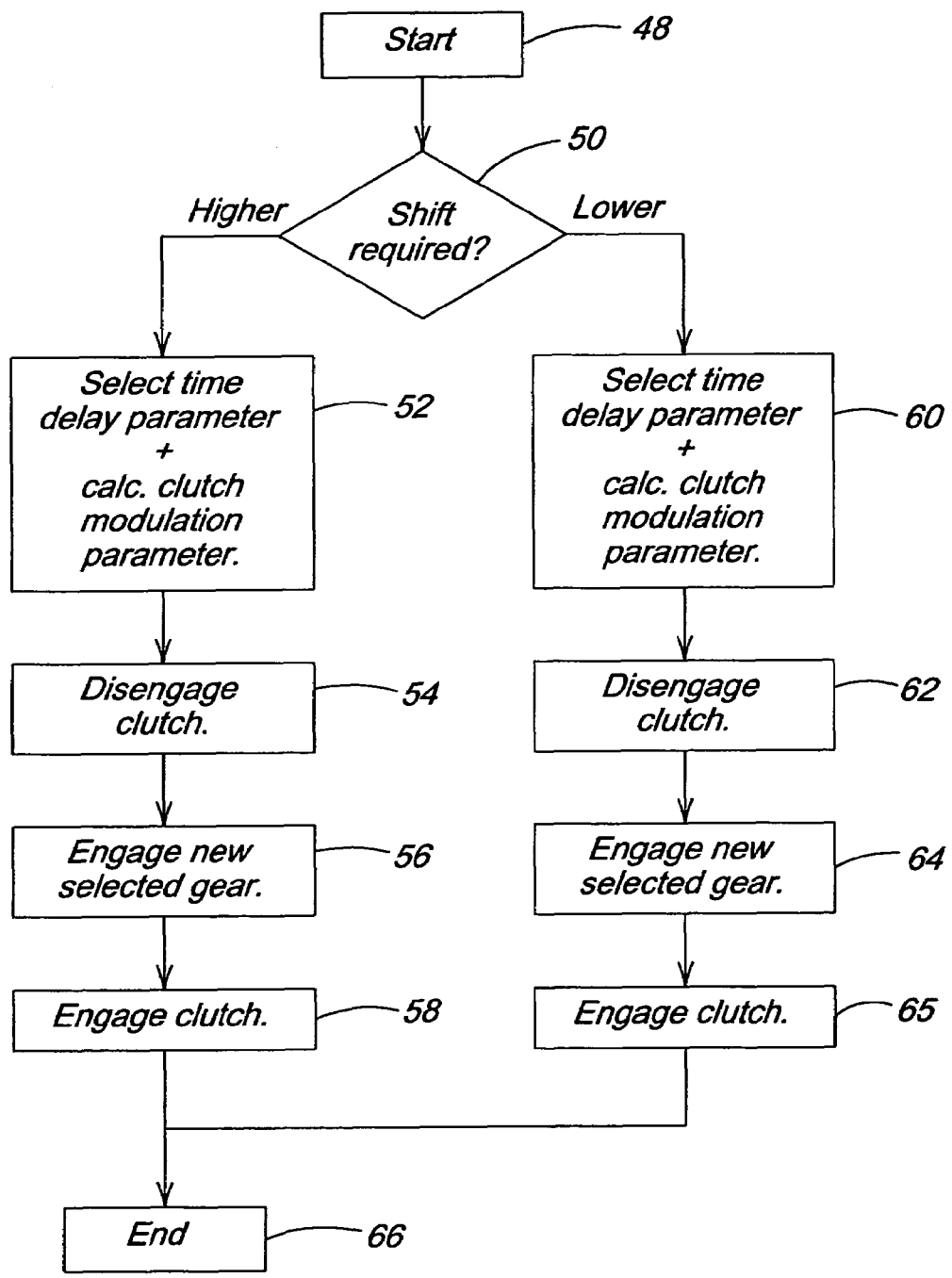
FIG. 3 shows a schematic flow chart of an algorithm executed by a control unit of FIG. 1.

The control unit 46 executes a shifting process, method or algorithm illustrated by the flow chart of FIG. 3, which starts with step 48. When the operator commands a shift of the power shift transmission 18, program step 50 directs the algorithm to a program sequence including steps 52–58 if an upshift is commanded or to a program sequence including steps 60–65 if a downshift is commanded.

The two program sequences 52–58 and 60–65 include the same program steps, but where steps 52–58 use upshift parameters and steps 60–65 use downshift parameters, such as pressure and time values. These parameters are preferably stored in a memory of the control unit 46 in the form of a pair of look-up tables.

Step 52 selects a time delay parameter, and calculates a degree of clutch modulation parameter for the reverser module 20. Step 54 disengages the reverser module 20. Step 56 engages the new gear ratio to which the power shift transmission 18 is being shifted. Step 58 re-engages reverser module 20.

Steps 60–65 are the same as steps 52–58, but are executed in the case of a downshift. The algorithm ends after steps 58 or 65 with step 67.

The conversion of the above flow chart into a standard language for implementing the algorithm described by the flow chart in a digital computer or microprocessor, will be evident to one with ordinary skill in the art.

The control unit 46 applies to the solenoid of valve 84 an electric current i, which varies as a function of time t, as illustrated by the current-time diagram of FIG. 4, which function is preferably stored in a memory of control unit 46. The electric current i0 an i5 is the current applied to the solenoid when reverser module 20 is fully engaged and the full amount of torque is transmitted. Time t0 represents the time at which the vehicle operator begins a shift of the transmission 18. Between time t0 and t1 the current is reduced linearly to the current value i1. The current is further linearly reduced to current value i2 from time t1 to t2, and the current is held essentially constant at i2 is from time t2 to t3 and the reverser module 20 is allowed to slip. During the interval between time t4 to t3 and t5 to t4, the current is increased to current level i3 and i4, respectively. At time t5 the new gear ratio of the transmission 18 is engaged, and current returned to value i5 at which the reverser module 20 is again fully engaged. Thus, valve 84 is controlled during shifting of the power shift transmission 18 to automatically partially disengage the reverser module 20 so that a portion of the torque continues to be transmitted from the engine 14 to the drive axle 40. This portion of the torque is preferably from 15% to 20% of the torque generated by the engine 14. The engine 14 remains in a nearly unchanged operating condition. Preferably, a predetermined minimum torque will be transmitted by the reverser module 20 during shifting of transmission 18.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

We claim:

1. A vehicle transmission system, comprising:
   an engine driven power shift transmission;
   a clutch module driven by the power shift transmission, the clutch module being mechanically coupled to a manually operable control device and coupled to receive a non-mechanical control signal, the clutch module being manually disengagable to prevent flow of torque therethrough, and the clutch module being controlled by a proportional pressure control valve which is controlled by a direction control lever;
   a gearbox between the engine and vehicle drive wheels, the gearbox being shiftable when the clutch module is disengaged; and
   a control unit coupled to the clutch module and to the power shift transmission, the control unit transmitting to the clutch module a control signal which automatically partially disengages the clutch module during shifting of the power shift transmission.

2. The transmission system of claim 1, wherein:
   the clutch module is controlled by a proportional pressure control valve which is controlled by a clutch pedal.

3. The transmission system of claim 1, wherein:
   the clutch module is controlled during shifting of the power shift transmission in accordance with a predetermined characteristic curve.

4. The transmission system of claim 1, wherein:
   the clutch module transmits a predetermined minimum torque during shifting of the power shift transmission.

5. The transmission system of claim 1, wherein:
   the clutch module is controlled during shifting of the power shift transmission according to a characteristic curve that occurs as a function of the immediately present operating condition of the vehicle and/or the engine.

6. The transmission system of claim 5, wherein:
   the control unit calculates the characteristic curve.

* * * * *